(12) United States Patent
Bansi et al.

(10) Patent No.: US 12,157,053 B2
(45) Date of Patent: *Dec. 3, 2024

(54) SYSTEMS AND METHODS FOR FACILITATING STREAMING INTERFACES FOR GAMES

(71) Applicant: Mythical, Inc., Sherman Oaks, CA (US)

(72) Inventors: Charnjit Bansi, Hayward, CA (US); Stephan Cunningham, Pasadena, CA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/979,530

(22) Filed: Nov. 2, 2022

(65) Prior Publication Data
US 2023/0056200 A1    Feb. 23, 2023

Related U.S. Application Data

(63) Continuation of application No. 17/385,885, filed on Jul. 26, 2021, now Pat. No. 11,497,994, which is a continuation of application No. 16/845,470, filed on Apr. 10, 2020, now Pat. No. 11,130,056, which is a continuation of application No. 16/532,175, filed on Aug. 5, 2019, now Pat. No. 10,639,548.

(51) Int. Cl.
| | |
|---|---|
| A63F 13/355 | (2014.01) |
| A63F 13/42 | (2014.01) |
| A63F 13/79 | (2014.01) |
| A63F 13/86 | (2014.01) |
| A63F 13/87 | (2014.01) |

(52) U.S. Cl.
CPC ............ *A63F 13/355* (2014.09); *A63F 13/42* (2014.09); *A63F 13/79* (2014.09); *A63F 13/86* (2014.09); *A63F 13/87* (2014.09)

(58) Field of Classification Search
None
See application file for complete search history.

(56) References Cited

U.S. PATENT DOCUMENTS

| | | | |
|---|---|---|---|
| 7,458,894 B2 * | 12/2008 | Danieli | A63F 13/35 463/42 |
| 10,387,007 B2 * | 8/2019 | Silva | H04N 7/181 |
| 10,639,548 B1 | 5/2020 | Bansi | |
| 10,913,002 B2 | 2/2021 | Goslin | |
| 11,130,056 B2 | 9/2021 | Bansi | |
| 11,263,670 B2 * | 3/2022 | Eatedali | G06Q 30/0631 |
| 2003/0038805 A1 | 2/2003 | Wong | |
| 2003/0041159 A1 | 2/2003 | Tinsley | |
| 2010/0306813 A1 | 12/2010 | Perry | |

(Continued)

*Primary Examiner* — Seng H Lim
(74) *Attorney, Agent, or Firm* — Esplin & Associates, PC

(57) ABSTRACT

Systems and methods for facilitating streaming interfaces for games are disclosed. Exemplary implementations may: obtain first view information based on an instance of a game for a first presentation of the game to a first user on a first client computing platform; effectuate a first presentation of the game to the first user via the first client computing platform; obtain second view information that includes a second graphical user interface; and effectuate a second presentation of the first user playing the game to a second user.

20 Claims, 4 Drawing Sheets

(56) References Cited

U.S. PATENT DOCUMENTS

| | | |
|---|---|---|
| 2011/0107220 A1 | 5/2011 | Perlman |
| 2012/0159327 A1 | 6/2012 | Law |
| 2013/0159375 A1 | 6/2013 | Perry |
| 2014/0184720 A1* | 7/2014 | Dasgupta ................ H04N 7/15 |
| | | 348/14.1 |
| 2014/0349750 A1 | 11/2014 | Thompson |
| 2015/0251095 A1 | 9/2015 | Perrin |
| 2016/0367891 A1* | 12/2016 | Trehan ................ A63F 13/216 |
| 2017/0006322 A1 | 1/2017 | Dury |
| 2017/0034237 A1* | 2/2017 | Silver ................ H04N 5/272 |
| 2017/0087460 A1 | 3/2017 | Perry |
| 2019/0118098 A1 | 4/2019 | Payzer |
| 2019/0118099 A1 | 4/2019 | Payzer |
| 2020/0160405 A1* | 5/2020 | Eatedali ................ A63F 13/65 |
| 2021/0038981 A1 | 2/2021 | Bansi |
| 2021/0354032 A1 | 11/2021 | Bansi |

\* cited by examiner

SYSTEMS AND METHODS FOR FACILITATING STREAMING INTERFACES FOR GAMES

FIELD OF THE DISCLOSURE

The present disclosure relates to systems and methods for facilitating streaming interfaces for games, including video games.

BACKGROUND

Video games, including online multi-player video games, are known. Watching other players play is known.

SUMMARY

One aspect of the present disclosure relates to a system configured for facilitating streaming interfaces for games. The system may include one or more hardware processors configured by machine-readable instructions. The processor(s) may be configured to obtain first view information based on an instance of a game for a first presentation of the game to a first user on a first client computing platform. The first view information may include a first graphical user interface. The first graphical user interface may include a first set of graphical user interface elements. The first set of graphical user interface elements may include a first element positioned in a first position on the first graphical user interface and a second element positioned in a second position on the first graphical user interface. The first position may be different from the second position. The processor(s) may be configured to effectuate a first presentation of the game to the first user via the first client computing platform. The first presentation may include at least part of the first graphical user interface. The processor(s) may be configured to obtain second view information that includes a second graphical user interface. The second graphical user interface may include a second set of graphical user interface elements. The second set of graphical user interface elements may include the first element and the second element and a third element. At least one of the first element and the second element may be positioned in positions on the second graphical user interface that differ from the first position and the second position on the first graphical user interface. The third element may be not included in the first graphical user interface. The processor(s) may be configured to effectuate a second presentation of the first user playing the game. The second presentation may be presented via a second client computing platform to a stream-watching user.

Another aspect of the present disclosure relates to a method for facilitating streaming interfaces for games. The method may include obtaining first view information based on an instance of a game for a first presentation of the game to a first user on a first client computing platform. The first view information may include a first graphical user interface. The first graphical user interface may include a first set of graphical user interface elements. The first set of graphical user interface elements may include a first element positioned in a first position on the first graphical user interface and a second element positioned in a second position on the first graphical user interface. The first position may be different from the second position. The method may include effectuating a first presentation of the game to the first user via the first client computing platform. The first presentation may include at least part of the first graphical user interface. The method may include obtaining second view information that includes a second graphical user interface. The second graphical user interface may include a second set of graphical user interface elements. The second set of graphical user interface elements may include the first element and the second element and a third element. At least one of the first element and the second element may be positioned in positions on the second graphical user interface that differ from the first position and the second position on the first graphical user interface. The third element may be not included in the first graphical user interface. The method may include effectuating a second presentation of the first user playing the game. The second presentation may be presented via a second client computing platform to a stream-watching user.

As used herein, any association (or relation, or reflection, or indication, or correspondency) involving servers, processors, client computing platforms, view information, user interfaces, positions, arrangements, layouts, presentations, users, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
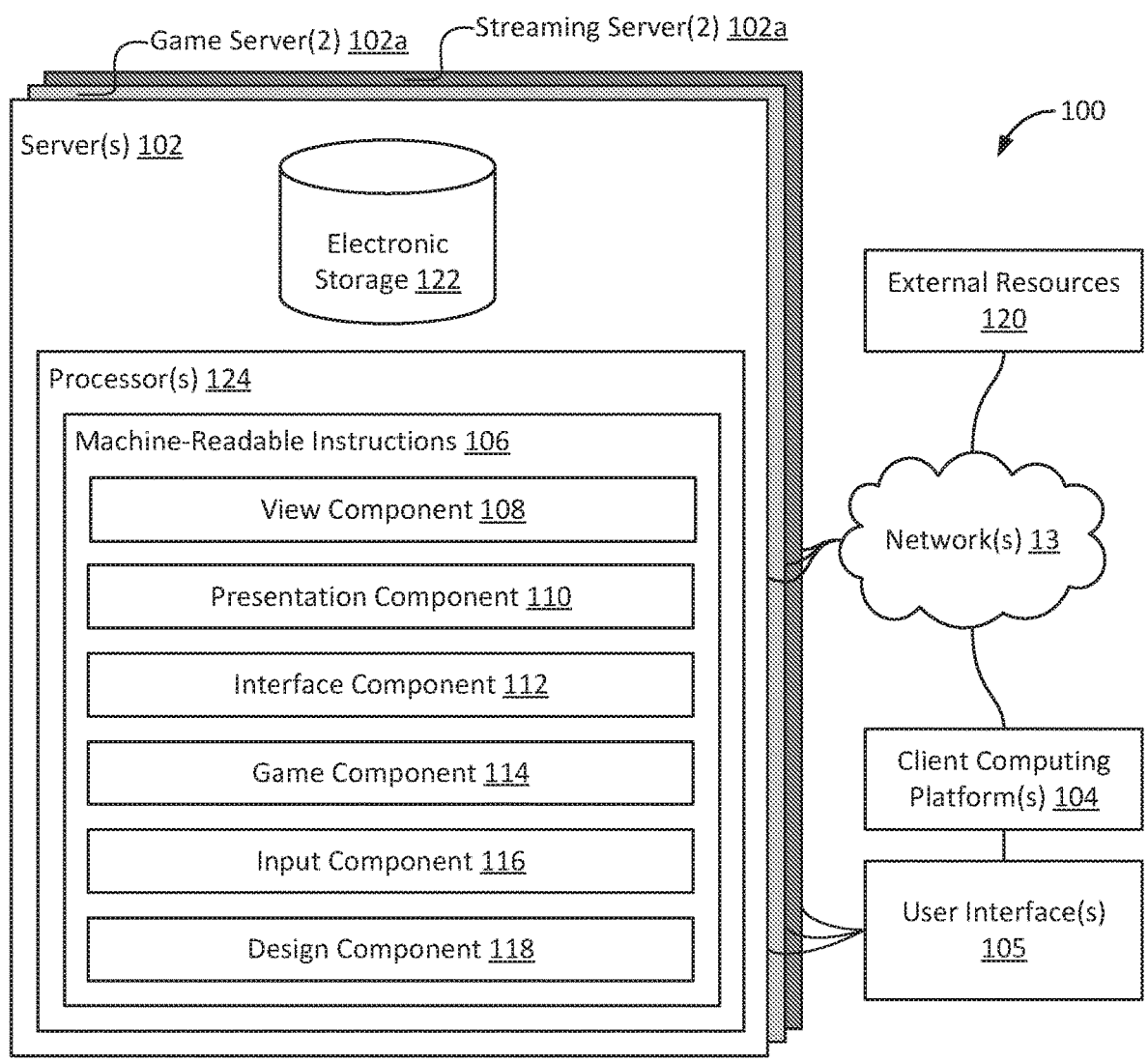
FIG. 1 illustrates a system configured for facilitating streaming interfaces for games, in accordance with one or more implementations.

FIG. 1 illustrates a system 100 configured for facilitating streaming interfaces for games, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. Users may include game-playing users (e.g., a first player, a second player, etc.), streaming users (e.g., a first streamer, a second streamer, etc.), stream-watching users (e.g., a first watcher, a second watcher, etc.), and/or other users. Individual users may be associated with individual client computing platforms 104. A game-playing user is a user who plays a game (on a particular client computing platform 104). A streaming user is a user who streams audio and/or video content (from an individual client computing platform) to one or more stream-watching users (and/or their individual client computing platforms 104) who receive and/or watch the streamed content on their individual client computing platforms 104. A first user may be associated with a first client computing platform 104, a second user may be associated with a second client computing platform 104, and so forth.

Server(s) 102 may be configured by machine-readable instructions 106. Server(s) 102 may include game server(s) 102a, streaming server(s) 102b, and/or other servers. In some implementations, game server 102a may be separate, discrete, and/or remote from one or more client computing platforms 104, including but not limited to client computing platforms associated with stream-watching users. In some implementations, streaming server 102b may be separate, discrete, and/or remote from one or more client computing platforms 104, including but not limited to client computing platforms associated with stream-watching users. Machine-readable instructions 106 may include one or more instruction components. The instruction components may include computer program components. The instruction components may include one or more of view component 108, presentation component 110, interface component 112, game component 114, input component 116, design component 118, and/or other instruction components.

View component 108 may be configured to obtain and/or determine view information based on an instance of a game for a presentation of the game to users on client computing platforms 104. In some implementations, obtaining view information may include determining, by a server such as game server 102a, particular view information. In some implementations, obtaining view information may include receiving, by a particular client computing platform 104, particular view information from a server such as game server 102a. In some implementations, obtaining view information may include receiving, by a particular server 102, particular view information from a different server such as a particular game server 102a. In some implementations, obtaining view information may include determining the view information by a particular client computing platform 104. In some implementations, view information may be obtained and/or determined from and/or by multiple components, such as game server 102a and a particular client computing platform 104.

In some implementations, view component 108 may be configured to determine view information. View information may include one or more graphical user interfaces. For example, view information for a first user may include a first graphical user interface, view information for a second user may include a second graphical user interface, and so forth. A particular graphical user interface may include a set of graphical user interface elements. Different graphical user interfaces may have one or more graphical user interface elements in common. For example, a first and second graphical user interface may both include a particular graphical user interface element, albeit potentially modified. In some implementations, the first and second graphical user interface may include one or more different elements, i.e., an element that is included in only one of the first and second graphical user interfaces.

A particular set of graphical user interface elements may include a first element positioned in a first position on a particular graphical user interface, a second element positioned in a second position on the particular graphical user interface, and so forth. In some implementations, the first position may be different from the second position. In some implementations, the first element positioned in the first position may not overlap the second element positioned in the second position.

Figure 3A:
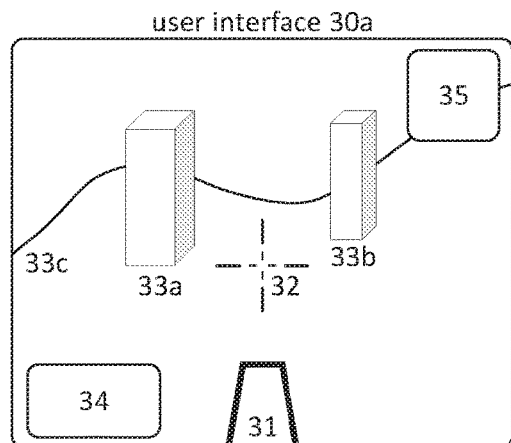
FIGS. 3A-3B-3C-3D-3E-3F illustrate exemplary user interfaces as may be used in a system configured for facilitating streaming interfaces for games, in accordance with one or more implementations.

By way of non-limiting example, FIG. 3A illustrates an exemplary user interface 30a for a particular game that includes a set of graphical user interface elements, including but not limited to a weapon 31, a target 32, game objects 33a and 33b, game scenery 33c, overlaid and/or superimposed informational game elements 34 and 35, and/or other elements. For example, an informational game element may be a map, game controls, inventory information, weapons information, ammunition information, progress information, battle information, alliance information, communication information, and/or other information relevant to the game. Informational game elements 34 and 35 may be positioned at different and non-overlapping positions within user interface 30a. Informational game elements need not be overlaid, nor in a static position. Graphical user interface elements may be blended, intelligently cropped, dynamically shown and removed, and/or otherwise combined with each other. For example, based on the current activity and/or gameplay, an informational game element may temporarily pop up and be superimposed on other elements in a graphical user interface, prior to being removed after a pre-determined interval or as triggered by the occurrence of another event within the game.

Referring to FIG. 1, in some implementations, view component 108 may be configured to determine an arrangement of a set of graphical user interface elements. For example, determination of the arrangement may be based on an analysis of visual information obtained by design component 118.

In some implementations, obtaining a particular view information may include receiving a first element by a particular client computing platform 104 from a particular server 102, and capturing a different element by the particular client computing platform 104. For example, the captured element may include captured video signals that depict a particular user playing a particular game. For example, the particular user may point one or more video cameras at himself, capturing all or some of his or her face, hands, and/or body while playing the particular game. In some implementations, the captured information may include audio information.

Presentation component 110 may be configured to effectuate presentations to users via client computing platforms 104. In some implementations, presentation component 110 may be configured to broadcast to different (stream-watching) users. In some implementations, presentations may include and/or depict the game. In some implementations, presentations may include view information and/or graphical user interfaces, e.g., as determined by view component 108. In some implementations, a particular presentation may depict the game from a perspective of a particular user. In some implementations, presentation component 110 may be configured to effectuate presentations via client computing platforms 104 to stream-watching users. For example, in some implementations, the presentation to a particular player during gameplay may be the same as or similar to the user interface depicted in FIG. 3A. The same user interface could be presented to stream-watching users, but a more compelling option is to modify and/or remove some graphical user interface elements, while adding one or more different graphical user interface elements to the view information that is streamed to stream-watching users.

Interface component 112 may be configured to determine and/or generate view information and/or graphical user interfaces. In some implementations, interface component may be configured to generate a particular graphical user interface such that it combines and/or includes one or more elements of a first graphical user interface and one or more elements of a second graphical user interface. For example, a generated graphical user interface may combine a first element of a first graphical user interface with a second element of a second graphical user interface. For example, a generated graphical user interface may combine a first element of a first graphical user interface, a second element of a second graphical user interface, and a third element of a third graphical user interface. In some implementations, a particular element of a particular graphical user interface may include captured video signals that depict a particular user as the particular user is playing the game.

Figure 3B:
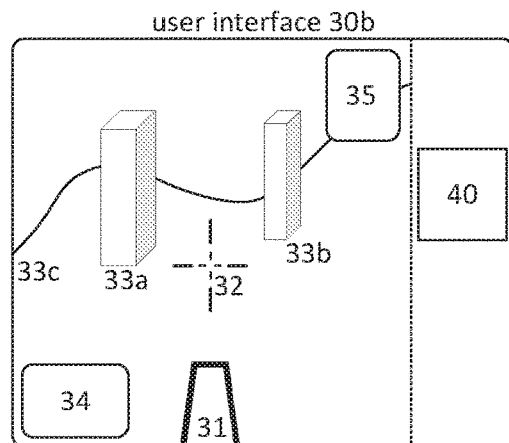
Figure 3C:
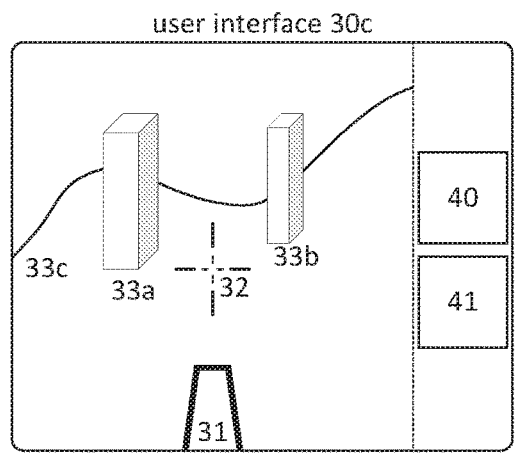

By way of non-limiting example, FIG. 3B illustrates an exemplary user interface 30b for a particular game that includes a set of graphical user interface elements similar to user interface 30a of FIG. 3A. However, in FIG. 3B, the set of graphical user interface elements is compressed and/or shrunk horizontally, and an additional graphical user interface element 40 is added on the right-hand side of the user interface. For example, element 40 may include video information depicting a particular user as the particular user is playing the game. An advantage of user interface 30b may be that the addition of element 40 does not obscure any other graphical user interface elements, so a stream-watching user can see all or most pertinent elements of the game. In some implementations, a player may choose to modify and/or remove some graphical user interface elements, while adding one or more different graphical user interface elements to the view information that is streamed to stream-watching users. In some cases, such choices by a player may be referred to as customizations. A player may customize both his personal graphical user interface used for playing the particular game, as well as a version of a graphical user interface that is used to present to stream-watching users. For example, FIG. 3C illustrates an exemplary user interface 30c for a particular game that includes a set of graphical user interface elements similar to user interface 30a of FIG. 3A. However, in FIG. 3C, the set of graphical user interface elements is modified in comparison to FIG. 3A. In FIG. 3C, informational game elements 34 and 35 have been removed, and two additional graphical user interface elements 40 and 41 have been added on the right-hand side of the user interface. For example, element 40 may include video information depicting a particular user as the particular user is playing the game. For example, element 41 may depict information that may be relevant and/or of interest to stream-watching users. For example, element 41 may depict a communication interface such that stream-watching users can communicate with each other and/or with the current player playing the game (e.g., a chat window). Alternatively, and/or simultaneously, element 41 may include advertisements, statistics pertaining to stream-watching users, subscriber information of stream-watching users that have subscribed to content by a particular player, progress towards a goal of the current player and/or subscribed stream-watching users, and/or other information.

Referring to FIG. 1, game component 114 may be configured to execute an instance of the game and implement the instance of the game by receiving and executing commands (or requests). The commands may be received from users through client computing platforms 104 associated with the users. By way of non-limiting example, execution of the commands may facilitate interactions between the users, and may determine view information for presentation of the online game to the users on client computing platforms 104. For example, in some implementations, the presentation to a particular player during gameplay may be the same as or similar to the user interface depicted in FIG. 3A.

In some implementations, game component 114 may be configured to execute and implement an instance of the game in a virtual space. The virtual space may include one or more of a multi-dimensional space, a two-dimensional space, a three-dimensional space, and/or another virtual space. An instance of the virtual space may include virtual space content determined based on individual virtual space content associated with individual objects and the arrangement(s) of the objects, and/or other information. In some implementations, the instance of the virtual space may include a simulated space that is accessible by the users. The simulated space may have a topography, express ongoing real-time interaction by one or more users, and/or include one or more objects positioned within the simulated topography that are capable of locomotion within the simulated topography. The simulated topography may include surface features of a surface or objects that are "native" to the space. In some instances, the simulated topography may describe a surface (e.g., a ground surface) that runs through at least a substantial portion of the space. In some instances, the simulated topography may describe a volume with one or more bodies and/or objects presented therein (e.g., celestial bodies).

In some implementations, game component 114 may use the instance of the virtual space to facilitate presentation of one or more views of the virtual space to a user. Game component 114 may use the instance of the virtual space to enable a user to interact with the virtual space. In some implementations, the execution of the instance of the virtual space may include game component 114 executing an instance of a game within the virtual space.

Game component 114 may be configured to receive user commands and/or requests to initiate actions at locations within the simulated topography of the virtual space. For example, a user request to initiate an action in the virtual space may specify an action type associated with the requested action. The action type may be used to obtain a function, method, routine, formula, software component or components, and/or any other means that may be used to execute the requested action. A user request to initiate an action may also specify one or more virtual space objects and/or characters to be acted on. Game component 114 may be configured to execute user-requested actions at virtual space locations in an instance of the virtual space. The virtual space locations may include, but not limited to, areas and/or locations appropriate for the virtual space.

Game component 114 may be configured to receive user commands and/or requests to participate in activities in the virtual space and execute those activities. The user-requested activities may include, but is not limited to, initiating virtual space transactions, partaking in a game, mission, quest, campaign, expedition, training, tutorial, research and/or so on in the virtual space, consulting a virtual space expert, messaging other users, convening, and/or any other virtual space activities.

The disclosure of the virtual space determined from the instance executed by game component 114 is not intended to be limiting. The virtual space may be presented in a more limited or richer manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by game component 114, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual goods and/or currency that the user can use (e.g., by manipulation of a user character or other user-controlled element, and/or other items) within the virtual space.

In some implementations, the users may participate in the instance of the virtual space by controlling one or more of the available user-controlled elements in the simulated topography of the virtual space. Control may be exercised through control inputs, commands, and/or other requests provided by the users through client computing platforms 104. For example, the commands provided by the user may specify an action involving user-controlled elements at a particular virtual space location. Such a user-initiated action in the virtual space may change the state of the virtual space at an instance when the action is executed in the virtual space. Such a user-initiated action in the virtual space may change views of the virtual space when the action is executed in the virtual space. In some implementations, the execution of commands may facilitate locomotion of user-controlled objects within the simulated topography of the virtual space. The view information may include a depiction of the user-controlled objects within the simulated topography of the virtual space. As used herein, any action described as occurring in or within a virtual space may also be considered to occur in or within a game.

Figure 3D:
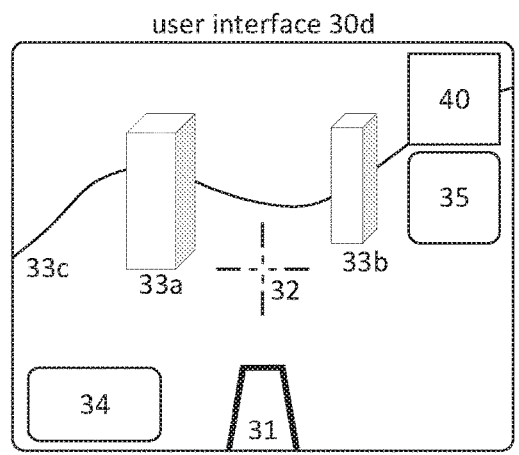
Figure 3E:
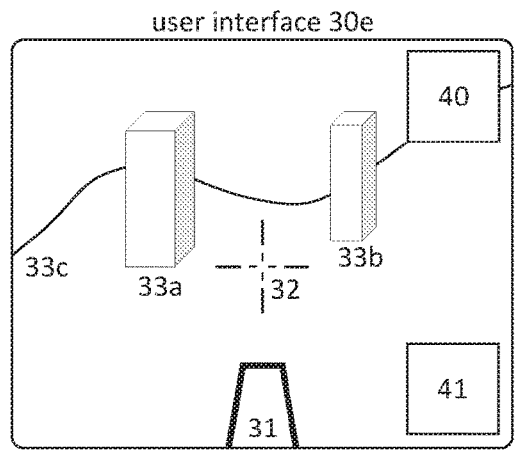

Input component 116 may be configured to receive user input from users and/or client computing platforms 104. In some implementations, the user input may reflect entry and/or selection of one or more requests and/or commands. In some implementations, the user input may reflect entry and/or selection of one or more customizations of graphical user interface elements. For example, the one or more customizations may include a modification of a position of a particular element in a particular graphical user interface. By way of non-limiting example, FIG. 3D illustrates an exemplary user interface 30d for a particular game that includes a set of graphical user interface elements similar to user interface 30a of FIG. 3A. However, in FIG. 3D, an additional graphical user interface element 40 is added on the right-hand side of the user interface. For example, element 40 may include video information depicting a particular user as the particular user is playing the game. In some implementations, element 40 may include an online handle of the particular user, ticker news about the particular user, and/or other information. However, the position of element 40 would have obscured informational game element 35 in user interface 30a. The current player may have customized this particular graphical user interface by modifying the position of informational game element 35 in user interface 30d such that it is no longer obscured by element 40. In other words, the current player may have some control over which graphical user interface elements are used when presenting a presentation to stream-watching users, and how these elements are used. One or more elements may be included, one or more elements may be excluded, one or more elements may be modified (sizes, shapes, colors, fonts, position, design elements, etc.), and/or one or more elements may be added. By way of non-limiting example, FIG. 3E illustrates an exemplary user interface 30e for a particular game that includes a set of graphical user interface elements similar to user interface 30a of FIG. 3A. However, in FIG. 3E, Informational game elements 34 and 35 have been removed, and two additional graphical user interface elements 40 and 41 have been added on the right-hand side of the user interface. For example, element 40 may include video information depicting a particular user as the particular user is playing the game. For example, element 41 may depict information that may be relevant and/or of interest to stream-watching users.

Figure 3F:
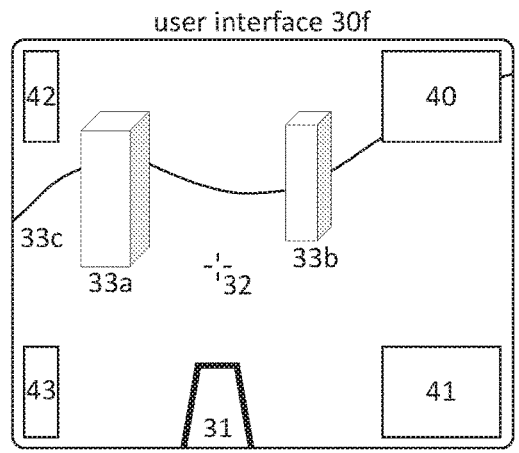

Referring to FIG. 1, design component 118 may be configured to obtain visual information from streaming channels and/or (live) streaming video platforms. For example, the visual information may include a screenshot, a video sequence, information regarding the arrangement and/or layout of a particular streaming channel, and/or other visual information. In some implementations, a particular streaming channel may be associated with a particular user, such as a first streamer. In some implementations, an arrangement and/or layout of a particular set of graphical user interface elements may be based on particular obtained visual information. In some implementations, an arrangement and/or layout of a particular set of graphical user interface elements may be based on an analysis of particular obtained visual information. By way of non-limiting example, FIG. 3F illustrates an exemplary user interface 30f for a particular game (as presented to stream-watching users) that includes a set of graphical user interface elements similar to user interface 30a of FIG. 3A. However, the arrangement of the set of graphical user interface elements in user interface 30f may be based on analysis of the streaming channel of a particular user. For example, as depicted in FIG. 3F, the arrangement may include overlaid graphical user interface elements 40, 41, 42, and 43, having particular positions (here, in each corner), particular shapes, and particular sizes. The arrangement may exclude informational game elements 34 and 35 in comparison to user interface 30a. The arrangement may use a modified target 32 that is smaller than target 32 in user interface 30a. By virtue of the customizations and/or arrangements described herein, presentations presented to stream-watching users may be less cluttered, more consistent, more elegant, and/or more enjoyable for the stream-watching users. In some implementations, the set of graphical user interface elements in user interface 30f may be off-centered (e.g., as here, to the left) to accommodate the larger overlaid graphical user elements 40 and 41 on the right-hand side as compared to the smaller overlaid graphical user elements 42 and 43 on the left-hand side. In some implementations, a particular stream-watching user may have some control over which graphical user interface elements are used when a particular presentation and/or graphical user interface is presented to a particular stream-watching user. For example, a particular stream-watching user may determine which elements to include, exclude, modify, and/or add. For example, a first watcher may increase the size of the video window depicting the current player, whereas a second watcher may remove that video window but keep only the audio from the current player.

Figure 4A:
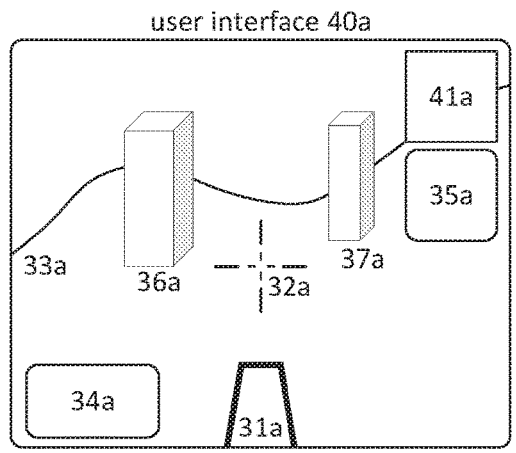
FIGS. 4A-4B-4C-4D illustrate exemplary user interfaces as may be used in a system configured for facilitating streaming interfaces for games, in accordance with one or more implementations.
Figure 4B:
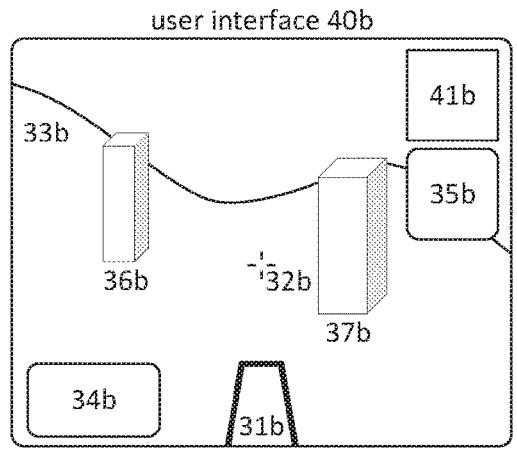
Figure 4C:
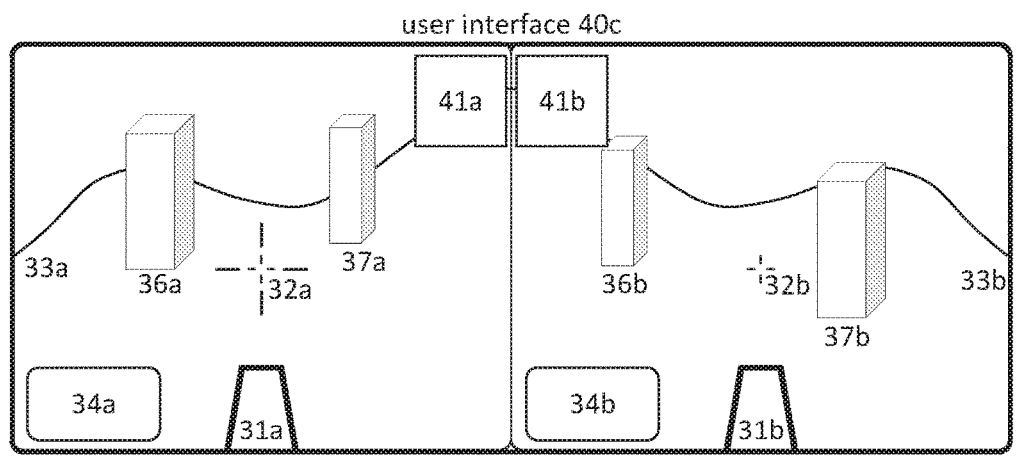

In some implementations, stream-watching users may watch a presentation that combines gameplay from multiple players at once. By way of non-limiting example, FIG. 4A illustrates a user interface 40a for a particular game that includes a set of graphical user interface elements similar to user interface 30d of FIG. 3D, including a weapon 31a, a target 32a, game objects 36a and 37a, game scenery 33a, overlaid and/or superimposed informational game elements 34a and 35a, and an additional graphical user interface element 41a that includes video information depicting a first player as the first player is playing the game. Stream-watching users may watch user interface 40a. Alternatively, and/or simultaneously, stream-watching users may watch user interface 40b depicted in FIG. 4B, which includes a set of graphical user interface elements similar to user interface 30d of FIG. 3D, including a weapon 31b, a target 32b, game objects 36b and 37b, game scenery 33b, overlaid and/or superimposed informational game elements 34b and 35b, and an additional graphical user interface element 41b that includes video information depicting a second player as the second player is playing the game. In some implementations, game objects 36a and 36b may be the same game object, viewed from different angles and distances by different players. In some implementations, game objects 36a and 37b may be the same game object, viewed from different angles and distances by different players. In some implementations, a particular stream-watching user may watch a combined and/or integrated user interface that includes information from the first player and the second player. By way of non-limiting example, FIG. 4C illustrates a user interface 40c that presents a combination of information from the first player (e.g., from user interface 40a in FIG. 4A) and the second player (e.g., from user interface 40b in FIG. 4B). For example, interface component 112 may be configured to generate a user interface such as user interface 40c. Note that informational game elements 35a and 35b have been removed, and that the position of graphical user interface element 41b has been moved. In some implementations, interface component 112 may be configured to modify audio information as well such that the resulting audio presented with user interface 40c is not as cluttered and/or cacophonous as merely adding all audio presented with user interface 40a to all audio presented with user interface 40b.

Figure 4D:
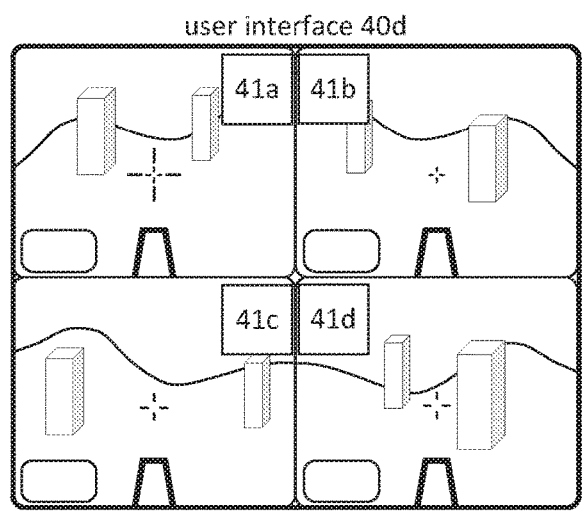

In some implementations, combining gameplay from multiple users for presentation to stream-watching users may not be limited to two players. For example, a combined presentation may include information from three, four, or more players at once. By way of non-limiting example, FIG. 4D illustrates a user interface 40d that presents a combination of information from a first player (e.g., from user interface 40a in FIG. 4A), a second player (e.g., from user interface 40b in FIG. 4B), a third player, and a fourth player. For example, interface component 112 may be configured to generate a user interface such as user interface 40d. Note that informational game elements (including informational game elements 35a and 35b) have been removed, and that the size and position of various graphical user interface elements (such as additional graphical user interface elements 41a and 41b) have been modified. In some implementations, interface component 112 may be configured to modify audio information as well such that the resulting audio presented with user interface 40d is not as cluttered and/or cacophonous as merely adding all audio presented with four player-specific user interfaces.

In some implementations, a particular player (or group of players) may broadcast and/or present multiple presentations that are related to each other. For example, a first presentation may depict the same view information as seen by the particular player while playing the game. For example, a second presentation may include a first set of modifications/removals/additions of graphical user interface elements when compared to the first presentation. For example, a third presentation may include a second set of modifications/removals/additions of graphical user interface elements when compared to the first presentation, such that the second presentation is different from the third presentation. For example, one presentation may use a different viewpoint and/or camera point, such as an overhead view depicting the particular player and/or other players. In some implementations, stream-watching users may select from multiple available presentations that are related to each other. For example, a stream-watching user may select a first presentation pertaining to a first player and a second presentation pertaining to a second player at the same time, e.g. in a game where the first player and the second player are playing together and/or otherwise interacting within the game.

In some implementations, interface component 112 may be configured to determine and/or generate different view information and/or different graphical user interfaces for different stream-watching users. For example, interface component 112 may be configured to generate a first graphical user interface for a first stream-watching user and a second graphical user interface for a second stream-watching user, e.g., at the same time. In some implementations, such differences may be based on the particular characteristics of the client computing platforms used by the stream-watching users. In some implementations, such differences may be based on the particular characteristics of the network connections of the client computing platforms used by the stream-watching users. In some implementations, such differences may be based on the particular preferences as determined by the stream-watching users. For example, for a client computing platform having a relatively large screen resolution, interface component 112 might add a relatively large (additional) graphical user interface element, whereas for a client computing platform having a relatively small screen resolution, such as a smartphone, interface component 112 might remove a particular graphical user interface element, such as a map.

In some implementations, input component 116 may be configured to offer different sets and/or ranges of customizations of graphical user interface elements to different streaming users. In some implementations, basic and/or elementary customizations may be offered at a first price, while more advanced, elaborate, and/or complicated customizations may be offered at a second price. For example, the first price may be lower than the second price.

Referring to FIG. 1, in some implementations, server(s) 102, client computing platform(s) 104, and/or external resources 120 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable an expert or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 120 may include sources of information outside of system 100, external entities participating with system 100, and/or other resources. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102. In some implementations, some or all of the functionality attributed herein to server(s) 102 may be provided by other components included in system 100, including but not limited to client computing platforms 104. For example, in some implementations, first view information may be obtained by a first client computing platform 104 from a remote game server 102a, second view information may include video information that is determined and/or captured locally by first client computing platform 104, and third view information (which is generated by first client computing platform 104 by combining elements of the first view information with elements of the second view information) is presented to stream-watching users. Alternatively, and/or simultaneously, any of these steps may be performed locally by one or more client computing platforms 104 and/or remotely by one or more servers 102. For example, captured video information may be provided by first client computing platform 104 to a particular streaming server 102b, which in turn generates the third view information and presents the third view information to stream-watching users. Alternatively, and/or simultaneously, in some implementations, a particular local client computing platform may perform all these steps locally (e.g., determining, capturing, generating, and/or presenting different types of view information).

Electronic storage 122 may comprise non-transitory storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute components 108, 110, 112, 114, 116, and/or 118, and/or other components. Processor(s) 124 may be configured to execute components 108, 110, 112, 114, 116, and/or 118, and/or other components by software; hardware; firmware; some combination of software, hardware, and/or firmware; and/or other mechanisms for configuring processing capabilities on processor(s) 124. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, and/or 118 are illustrated in FIG. 1 as being implemented within a single processing unit, in implementations in which processor(s) 124 includes multiple processing units, one or more of components 108, 110, 112, 114, 116, and/or 118 may be implemented remotely from the other components. The description of the functionality provided by the different components 108, 110, 112, 114, 116, and/or 118 described below is for illustrative purposes, and is not intended to be limiting, as any of components 108, 110, 112, 114, 116, and/or 118 may provide more or less functionality than is described. For example, one or more of components 108, 110, 112, 114, 116, and/or 118 may be eliminated, and some or all of its functionality may be provided by other ones of components 108, 110, 112, 114, 116, and/or 118. As another example, processor(s) 124 may be configured to execute one or more additional components that may perform some or all of the functionality attributed below to one of components 108, 110, 112, 114, 116, and/or 118.

Figure 2:
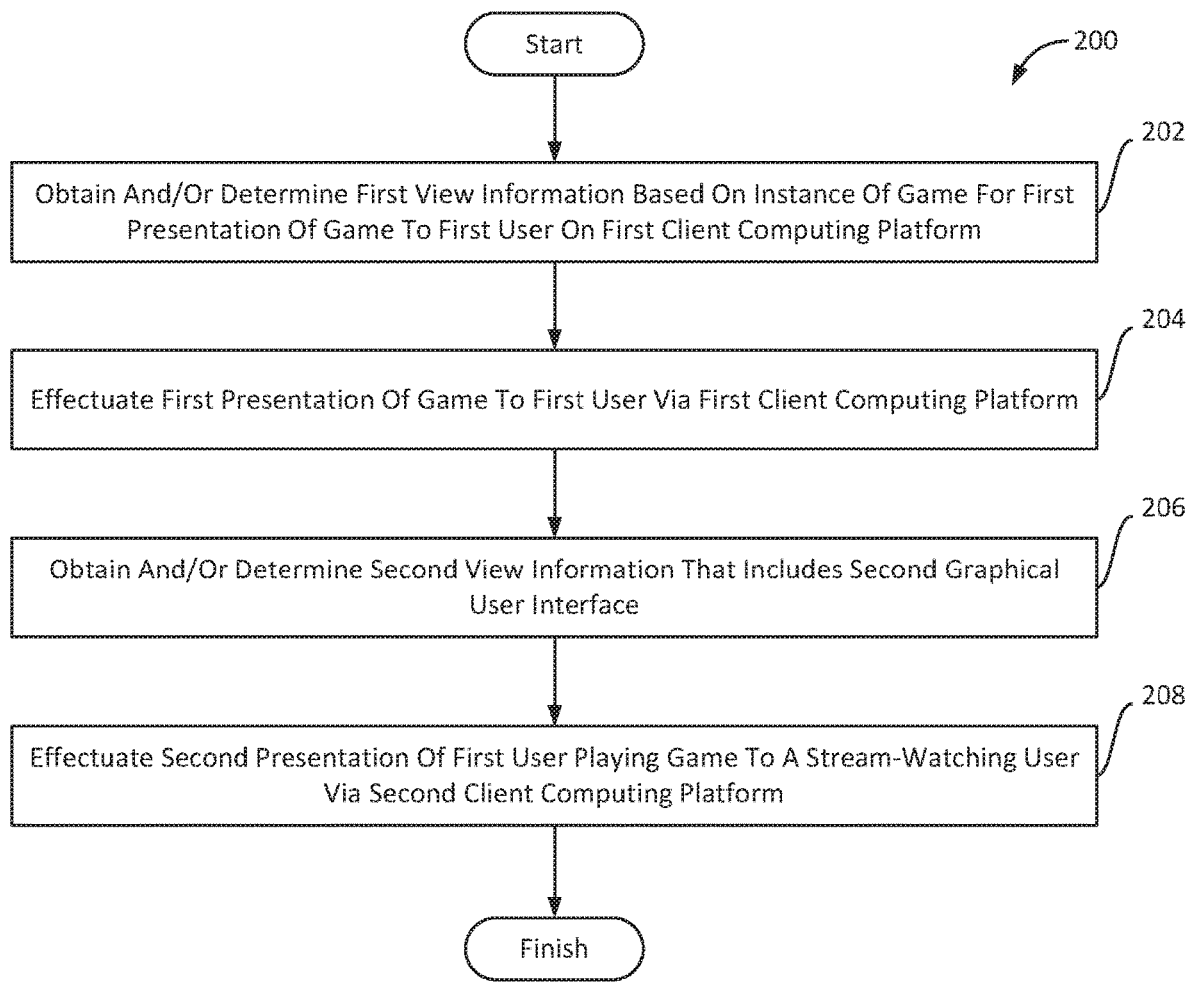
FIG. 2 illustrates a method for facilitating streaming interfaces for games, in accordance with one or more implementations.

FIG. 2 illustrates a method 200 for facilitating streaming interfaces for games, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining and/or determining first view information based on an instance of a game for a first presentation of the game to a first user on a first client computing platform. The first view information may include a first graphical user interface. The first graphical user interface may include a first set of graphical user interface elements. The first set of graphical user interface elements may include a first element positioned in a first position on the first graphical user interface and a second element positioned in a second position on the first graphical user interface. The first position may be different from the second position. Operation 202 may be performed by one or more hardware processors configured by machine-readable instructions including a component that is the same as or similar to view component 108, in accordance with one or more implementations.

An operation 204 may include effectuating a first presentation of the game to the first user via the first client computing platform. The first presentation may include at least part of the first graphical user interface. Operation 204 may be performed by one or more hardware processors configured by machine-readable instructions including a component that is the same as or similar to presentation component 110, in accordance with one or more implementations.

An operation 206 may include obtaining and/or determining second view information that includes a second graphical user interface. The second graphical user interface may include a second set of graphical user interface elements. The second set of graphical user interface elements may include the first element and the second element and a third element. At least one of the first element and the second element may be positioned in positions on the second graphical user interface that differ from the first position and the second position on the first graphical user interface. The third element may be not included in the first graphical user interface. Operation 206 may be performed by one or more hardware processors configured by machine-readable instructions including a component that is the same as or similar to view component 108, in accordance with one or more implementations.

An operation 208 may include effectuating a second presentation of the first user playing the game. The second presentation may be presented via a second client computing platform to a stream-watching user. Operation 208 may be performed by one or more hardware processors configured by machine-readable instructions including a component that is the same as or similar to presentation component 110, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for facilitating streaming interfaces for games, the system comprising:
   one or more hardware processors configured by machine-readable instructions to:
   obtain first view information based on an instance of a game, wherein the first view information includes a first graphical user interface, wherein the first graphical user interface includes a first set of graphical user interface elements, wherein the first set of graphical user interface elements include a first element positioned in a first position on the first graphical user interface;
   obtain, from a first client computing platform associated with a first user, captured video signals that depict the first user as the first user is playing the game;
   receive user input from the first client computing platform by the first user, wherein the user input reflects entry and/or selection of customizations of a second set of graphical user interface elements for a second graphical user interface, wherein the customizations include a first customization that modifies the first position of the first element in the second graphical user interface;
   obtain second view information that includes the second graphical user interface that is based on the first graphical user interface, wherein the second graphical user interface includes the second set of graphical user interface elements, wherein, compared to the first graphical user interface, the second set of graphical user interface elements is customized in accordance with the first customization, and wherein the second set of graphical user interface elements further adds a third element that depicts the first user playing the game, wherein the third element is based on the captured video signals; and effectuate a presentation of the second graphical user interface including the third element that depicts the first user playing the game, wherein the presentation is presented via a second client computing platform to a stream-watching user.

2. The system of claim 1, wherein obtaining the first view information includes determining, by a server, the first view information.

3. The system of claim 1, wherein obtaining the first view information includes receiving, by the first client computing platform, the first view information from a server.

4. The system of claim 1, wherein the third element is not included in the first graphical user interface.

5. The system of claim 1, wherein the first view information depicts the game from a perspective of the first user.

6. The system of claim 1, wherein the third element included in the second set of graphical user interface elements includes captured video signals that depict the first user playing the game.

7. The system of claim 1, wherein the one or more hardware processors are further configured by machine-readable instructions to:

execute the instance of the game, such execution of the instance of the game including receipt and execution of commands, wherein the commands are received from the users through the client computing platforms associated with the users, wherein the execution of the commands facilitates interactions between the users via the game, wherein the users include the first user, and wherein the client computing platforms include the first client computing platform associated with the first user.

8. The system of claim 1, wherein the one or more hardware processors are further configured by machine-readable instructions to:

obtain visual information from a particular streaming channel, wherein the particular streaming channel is associated with the first user;

wherein an arrangement of the second set of graphical user interface elements is based on an analysis of the visual information.

9. The system of claim 1, wherein the first set of graphical user interface elements further includes a second element positioned in a second position on the first graphical user interface, wherein the first position is different from the second position, wherein the customizations further include a second customization that removes the second element in a second graphical user interface, and wherein the second set of graphical user interface elements is further customized in accordance with the second customization.

10. The system of claim 9, wherein the first element positioned in the first position on the first graphical user interface does not overlap the second element positioned in the second position on the first graphical user interface.

11. A method for facilitating streaming interfaces for games, the method comprising:

obtaining first view information based on an instance of a game, wherein the first view information includes a first graphical user interface, wherein the first graphical user interface includes a first set of graphical user interface elements, wherein the first set of graphical user interface elements include a first element positioned in a first position on the first graphical user interface;

obtaining, from a first client computing platform associated with a first user, captured video signals that depict the first user as the first user is playing the game;

receiving user input from the first client computing platform by the first user, wherein the user input reflects entry and/or selection of customizations of a second set of graphical user interface elements for a second graphical user interface, wherein the customizations include a first customization that modifies the first position of the first element in the second graphical user interface;

obtaining second view information that includes the second graphical user interface that is based on the first graphical user interface, wherein the second graphical user interface includes the second set of graphical user interface elements, wherein, compared to the first graphical user interface, the second set of graphical user interface elements is customized in accordance with the first customization, and wherein the second set of graphical user interface elements further adds a third element that depicts the first user playing the game, wherein the third element is based on the captured video signals; and effectuating a presentation of the second graphical user interface including the third element that depicts the first user playing the game, wherein the presentation is presented via a second client computing platform to a stream-watching user.

12. The method of claim 11, wherein obtaining the first view information includes determining, by a server, the first view information.

13. The method of claim 11, wherein obtaining the first view information includes receiving, by the first client computing platform, the first view information from a server.

14. The method of claim 11, wherein the third element is not included in the first graphical user interface.

15. The method of claim 11, wherein the first view information depicts the game from a perspective of the first user.

16. The method of claim 11, wherein the third element included in the second set of graphical user interface elements includes captured video signals that depict the first user playing the game.

17. The method of claim 11, further comprising:

executing the instance of the game, such execution of the instance of the game including receipt and execution of commands, wherein the commands are received from the users through the client computing platforms associated with the users, wherein the execution of the commands facilitates interactions between the users via the game, wherein the users include the first user, and wherein the client computing platforms include the first client computing platform associated with the first user.

18. The method of claim 11, further comprising:

obtaining visual information from a particular streaming channel, wherein the particular streaming channel is associated with the first user;

wherein an arrangement of the second set of graphical user interface elements is based on an analysis of the visual information.

19. The method of claim 11, wherein the first set of graphical user interface elements further includes a second element positioned in a second position on the first graphical user interface, wherein the first position is different from the second position, wherein the customizations further include a second customization that removes the second element in a second graphical user interface, and wherein the second set of graphical user interface elements is further customized in accordance with the second customization.

20. The method of claim 19, wherein the first element positioned in the first position on the first graphical user interface does not overlap the second element positioned in the second position on the first graphical user interface.

* * * * *